(12) United States Patent
Tarnowski et al.

(10) Patent No.: US 12,053,936 B2
(45) Date of Patent: Aug. 6, 2024

(54) BONDING CONCENTRIC ELEMENTS

(71) Applicant: B/E Aerospace, Inc., Winston Salem, NC (US)

(72) Inventors: Adrian Tarnowski, Wroclaw (PL); Piotr Kroczek, Wroclaw (PL)

(73) Assignee: B/E AEROSPACE, INC., Winston Salem, NC (US)

( * ) Notice: Subject to any disclaimer, the term of this patent is extended or adjusted under 35 U.S.C. 154(b) by 186 days.

(21) Appl. No.: 17/569,184

(22) Filed: Jan. 5, 2022

(65) Prior Publication Data

US 2022/0250333 A1 Aug. 11, 2022

(30) Foreign Application Priority Data

Feb. 10, 2021 (EP) ..................... 21461511

(51) Int. Cl.
*B29C 65/00* (2006.01)
*B29C 65/48* (2006.01)
*B29C 65/54* (2006.01)

(52) U.S. Cl.
CPC ........ *B29C 66/5344* (2013.01); *B29C 65/485* (2013.01); *B29C 65/542* (2013.01); *B29C 66/1122* (2013.01)

(58) Field of Classification Search
CPC ............. B29C 66/5344; B29C 66/1122; B29C 66/301; B29C 66/534; B29C 66/53;
(Continued)

(56) References Cited

U.S. PATENT DOCUMENTS 23,811 A * 4/1859 Quinn ...................... F16L 13/11
285/347
506,484 A * 10/1893 Ewing ...................... F16L 13/11
285/374
(Continued)

FOREIGN PATENT DOCUMENTS

| CN | 105666855 A | 6/2016 |
| DE | 19520065 A1 | 12/1996 |
| DE | 10348820 B3 | 8/2004 |

OTHER PUBLICATIONS

Extended European Search Report issued in EP 21461511.4, dated Jul. 8, 2021.

*Primary Examiner* — Philip C Tucker
*Assistant Examiner* — Brian R Slawski
(74) *Attorney, Agent, or Firm* — SNELL & WILMER L.L.P.

(57) ABSTRACT

A component comprising a first concentric element and a second concentric element is disclosed. The first and second concentric elements are positioned relative to each other in the positions in which they are to be bonded together. The first concentric element comprises a first bonding portion (48) with a first bonding face (50), and the second concentric element comprises a second bonding portion (58) with a second bonding face (60), a first passage (62), and a second passage (64). The second bonding portion (58) partially surrounds the first bonding portion (48) and the first and second bonding faces (50, 60) face each other. The first and second bonding faces (50, 60) comprise a first and second void face (56, 61) respectively. Collectively the first and second bonding faces (50, 60) comprise an alpha plug (52) having an alpha plug face, a beta plug (54) having a beta plug face, an alpha bearing face, and a beta bearing face, in which the alpha plug face is in sliding contact with the alpha bearing face and the beta plug face is in sliding contact with the beta baring face, the alpha plug (52) is integral with one of the first or second void faces (56, 61) and the alpha bearing face is integral with the other of the first or second void faces (56, 61), the beta plug (54) is integral with one of the first or second void faces (56, 61) and the beta bearing face is integral with the other of the first or second void faces (Continued)

(56, 61), and the alpha and beta plugs (52, 54) and first and second void faces (56, 61) collectively define a void. The first and second passages (62, 64) each extend through the second concentric element from a mouth which opens onto the void to a mouth in an accessible surface of the second concentric element.

11 Claims, 4 Drawing Sheets

(58) Field of Classification Search
CPC ... B29C 66/52; B29C 66/5221; B29C 65/485; B29C 65/542; B29C 65/483; B29C 65/56; B29C 65/565; B29C 65/72; F16B 11/008; F16L 47/02
USPC ......... 156/60, 293, 294, 296, 305, 330, 332; 428/36.91; 285/331, 93, 374, 399, 18; 138/141, DIG. 1, 155
See application file for complete search history.

(56) References Cited

U.S. PATENT DOCUMENTS

| | | | |
|---|---|---|---|
| 5,087,147 A * | 2/1992 | Petrzelka | B29C 66/721 403/268 |
| 5,152,481 A * | 10/1992 | Cote | F16B 7/0486 403/268 |
| 5,464,171 A | 11/1995 | Ripplinger | |
| 5,887,909 A | 3/1999 | Tokuda | |
| 7,278,212 B2 * | 10/2007 | Bommarito | F16D 3/385 29/458 |
| 2003/0102668 A1 * | 6/2003 | Tarbutton | B21D 39/04 156/305 |
| 2006/0196990 A1 | 9/2006 | Wallace | |
| 2011/0158741 A1 * | 6/2011 | Knaebel | B62D 27/026 156/293 |
| 2018/0038540 A1 | 2/2018 | Russalian | |
| 2019/0184465 A1 | 6/2019 | Kreig et al. | |
| 2019/0322055 A1 * | 10/2019 | Okoli | B62D 29/048 |
| 2020/0056368 A1 | 2/2020 | Adachi | |

* cited by examiner

BONDING CONCENTRIC ELEMENTS

CROSS REFERENCE TO RELATED APPLICATIONS

This Application claims the benefit of priority of European Patent Application No. EP 21461511.4, filed on Feb. 10, 2021, the content of which is incorporated herein by reference its entirety.

This disclosure relates to the bonding of concentric elements that form part of a component, in particular to the design of concentric elements to achieve an improved bond between them, and a method of bonding concentric elements.

Some components for use as part of a mechanical, electro mechanical, pneumatic or similar systems are constructed from a number of separate elements. Those elements can be joined together to form the component using various techniques. In some instances first and second elements are to be joined where the first element comprises a first bonding portion including a first bonding face, and the second element comprises a second bonding portion including a second bonding face, and the first and second elements are so configured that when bonded together the first bonding portion is at least partially surrounded by the second bonding portion, the first and second bonding faces are close to and face towards each other, and the first and second bonding faces are substantially parallel with each other. This may be described as the bonding of first and second concentric elements.

A basic example of such concentric elements is where the first and second elements are cylindrical tubes which are to be bonded with one of the tubes at least partially within the other. To make such a bond it is known for the first tube to have an outer diameter which is a little, for example in the range of about 0.5 mm to 2.0 mm, smaller than the inner diameter of the second tube. In such an example at least a portion of the radially outer surface of the first tube is the first bonding face, and at least a portion of the radially inner surface of the second tube is the second bonding face. To bond the two tubes, a known technique is that a layer of adhesive is applied to one or both of the first bonding face and the second bonding face and the first bonding portion is then pushed into the second bonding portion until the desired relative positions of the first and second elements is achieved. This may be a position in which a part of the first element interferes with a part of the second element and prevents the first bonding portion being pushed further into the second bonding portion. The adhesive is then left to set/cure.

More complex first and second concentric elements include first and second bonding portions and other portions with other functions. Again, however, when they are to be bonded the first bonding portions of the first element is surrounded by the second bonding portion of the second element and they are known to be joined in the same way as described for the basic example above.

According to a first aspect of the present disclosure there is provided a component comprising a first concentric element and a second concentric element in which the first and second concentric elements are positioned relative to each other in the positions in which they are to be bonded together. The first concentric element comprises a first bonding portion with a first bonding face and the second concentric element comprises a second bonding portion with a second bonding face, a first passage, and a second passage. The second bonding portion partially surrounds the first bonding portion and the first and second bonding faces face each other. The first and second bonding faces comprise a first and second void face respectively, and between them/collectively the first and second bonding faces further comprise an alpha plug having an alpha plug face, a beta plug having a beta plug face, an alpha bearing face and a beta bearing face. The alpha plug face is in sliding or close contact with the alpha bearing face and the beta plug face is in sliding contact with the beta baring face, the alpha plug is integral with one of the first or second void faces and the alpha bearing face is integral with the other of the first or second void faces. The beta plug is integral with one of the first or second void faces and the beta bearing face is integral with the other of the first or second void faces. The alpha and beta plugs and the first and second void faces collectively define a void. The first and second passages each extend through the second concentric element from a mouth which opens onto the void to a mouth in an accessible surface of the second concentric element.

The first and second bonding faces can be comprised of one or more face portions. These face portions can be continuous and joined by corners or folds.

The first and second void faces are constituents of the first and second bonding faces respectively. The void defined by the first and second void faces and the alpha and beta plugs is a void into which adhesive will be injected when the first and second concentric elements are bonded together. The void partially surrounds the first bonding portion, and the thickness of the void (along the shortest path from the first void face to the second void face) is determined by the thickness of the alpha and beta plugs in the same direction. The thickness of the void determines the thickness of the adhesive layer once the first and second concentric elements have been bonded together.

The alpha plug face/alpha bearing face and beta plug face/beta bearing face are so configured that the sliding fit between them is sufficiently tight that once adhesive is injected into the void, it does not flow between the alpha/beta plug face and the alpha/beta bearing faces. How tight that sliding fit is required to be will depend in part upon the viscosity of the adhesive to be injected into the void.

For the purposes of the present disclosure, reference to injected in connection with the adhesive is to be understood to be reference to any method of introducing an adhesive in liquid or paste form into the void.

An accessible face of the second concentric element is one that a human user or automated assembly apparatus can access when the first and second concentric elements are positioned relative to each other ready for bonding to each other.

In an embodiment of any of the above embodiments, the first bonding face comprises the alpha and beta plugs and first void face with the first void face extending between the alpha and beta plugs, and the second bonding face comprises the alpha and beta bearing faces and second void face with the second void face extending between the alpha and beta bearing faces.

In an alternative embodiment of any of the above embodiments, the second bonding face comprises the alpha and beta plugs and second void face with the second void face extending between the alpha and beta plugs, and the first bonding face comprises the alpha and beta bearing faces and first void face with the first void face extending between the alpha and beta bearing faces.

The component/first and second concentric elements of the present disclosure are advantageous because the adhesive for bonding the first and second concentric elements is injected into the void with the first and second concentric elements in the relative positions they are intended to be in. As a result, there is no need to move the first and second concentric elements once the adhesive has been applied and the risk of extruded beads of excess adhesive, which can impair the functionality of the component once fully constructed, are minimised.

A further advantage of the component/first and second concentric elements of the present disclosure is that because the first and second concentric elements are not moved relative each other once adhesive has been injected into the void, there is a minimum risk that the adhesive will unevenly distribute itself within the joint between the first and second concentric elements, potentially leading to weak zones in the bond. Furthermore, any weakening of the adhesive by introduction of shear stresses into the adhesive can be avoided.

A further advantage of the component/first and second concentric elements of the present disclosure is that the injection of the adhesive through one of the passages until the adhesive reaches the other passage is that this assists in forming a continuous and uniform layer of adhesive between the bonding portions of the first and second concentric elements. This can maximise the strength of the bond between the first and second concentric elements.

In an embodiment of any of the above embodiments, the first and second bonding portions are so configured that the first bonding portion is physically prevented from extending into the second bonding portion by more than a predetermined distance. In some embodiments the prevention is a result of interference between a part of the first concentric element and a part of the second concentric element.

In an embodiment of any of the above embodiments, the first and second bonding portions are so configured that when the first bonding portion is partially surrounded by the second bonding portion, the only movement the first bonding portion can make relative to the second bonding portion is movement between a position where the first bonding portion is not partially surrounded by the second bonding portion and the position in which the first bonding portion extends a predetermined distance into the second bonding portion. This configuration is advantageous because it minimises the risk of any movement between the first and second concentric elements once the adhesive has been injected into the void. Such movement whilst the adhesive is setting can impair the strength of the bond after the adhesive has set/cured.

In an embodiment of any of the above embodiments, the mouth of the first passage onto the void and the mouth of the second passage onto the void are spaced from each other, in that one mouth is in the alpha plug or nearer the alpha plug than the beta plug, and the other mouth is in the beta plug or nearer the beta plug than the alpha plug. The spacing of the mouths onto the void assists in maximising the filling of the void with adhesive and helps to avoid air bubbles being trapped in the void by the adhesive.

In an embodiment of any of the above embodiments, one or both of the first and second concentric elements comprises at least one adhesive guide means, and the at least one adhesive guide means extends across the most direct path through the void from the mouth of the first passage onto the void and the mouth of the second passage onto the void. The adhesive guide means help in directing the flow of adhesive to all parts of the void and seeks to minimise the quantity of adhesive travelling straight from the mouth onto the void through which the adhesive is injected to the mouth onto the void by which the adhesive can exit.

In an embodiment of any of the above embodiments, one or both of the first and second concentric elements comprises an adhesive guide means, in which the adhesive guide means is a fin extending from one of the first and second void faces toward the other of the first and second void faces, and the fin has a first end at or adjacent the alpha plug, a second end at or adjacent the beta plug, and the fin defines a path between the mouth of the first passage onto the void and the mouth of the second passage onto the void. In some embodiments, the fin extends between its first and second ends in an at least partially non-linear direction.

In an embodiment of any of the above embodiments, one or both of the first and second concentric elements comprises an adhesive guide means in which the first and second void faces are cylindrical, the adhesive guide means extends from the surface of one of the first and second void faces toward the other of the first and second void faces, and at least a part of the adhesive guide means has the form of a helix.

In an embodiment of the above embodiments, the mouth of the first passage onto the void is close to one end of the fin, and the mouth of the second passage is close to the other end of the fin. The fin significantly influences the flow of the adhesive between the mouths onto the void.

In an embodiment of any of the above embodiments, the adhesive guide means is fixed to one of the first and second void faces, and is in sliding contact with the other of the first and second void faces. In alternative embodiments of the above embodiments, the adhesive guide means is fixed to one of the first and second void faces, and is spaced from the other of the first and second void faces.

In an embodiment of any of the above embodiments, the component is an auto drain valve, and the first concentric element is a bowl and the second concentric element is a connector.

In an embodiment of any of the above embodiments there is provided a component according to any preceding claim in which the first and second elements have been bonded to each other by the injection of an adhesive into the void.

According to a second aspect of the present disclosure there is provided a method of bonding a first concentric element and a second concentric element of a component according to the first aspect of the present disclosure in which an adhesive applicator is engaged with the mouth of one of the first and second passage in an accessible surface of the second concentric element, the applicator is actuated and injects adhesive into passage with which the applicator is engaged and into the void until a predetermined event occurs, and actuation of the applicator is then stopped.

In an embodiment of any of the above embodiments, the predetermined event is one of:
  detection of adhesive in the other of the first and second passage,
  adhesive flowing out of the mouth of the other of the first and second passage in the accessible surface of the second concentric element;
  a flow of adhesive exiting the mouth of the other of the first and second passage in the accessible surface of the second concentric element in which that adhesive does not contain any more than a minimum quantity of entrained air bubbles;
  a predetermined quality of adhesive has been injected with the passage/void.

In an embodiment of any of the above embodiments, the mouth onto the void associated with the passage with which the adhesive applicator is engaged is vertically lower than the mouth onto the void of the passage not engaged with the applicator. This arrangement assists in the adhesive excluding as much air as possible from the void as the adhesive is injected into the void because the adhesive will fill the void from its bottom as it is orientated during the adhesive injection.

In an embodiment of any of the above embodiments, the adhesive is one of an acrylic adhesive, methyl methacrylate adhesive, or an epoxy adhesive. Such adhesives are well known and can be selected to suit the materials of the first and second bonding portions of the first and second concentric elements.

The present invention will be further described and explained by way of example and with reference to the accompanying drawings in which FIG. 1 shows a schematic illustration of an auto drain valve;

Figure 1:
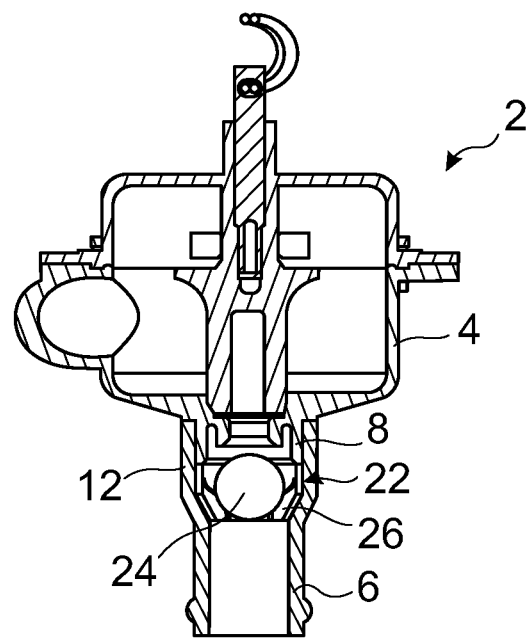

With reference to FIG. 1, an auto drain valve 2 comprises a bowl 4, a connector 6, and a check valve 22.

Figure 2:
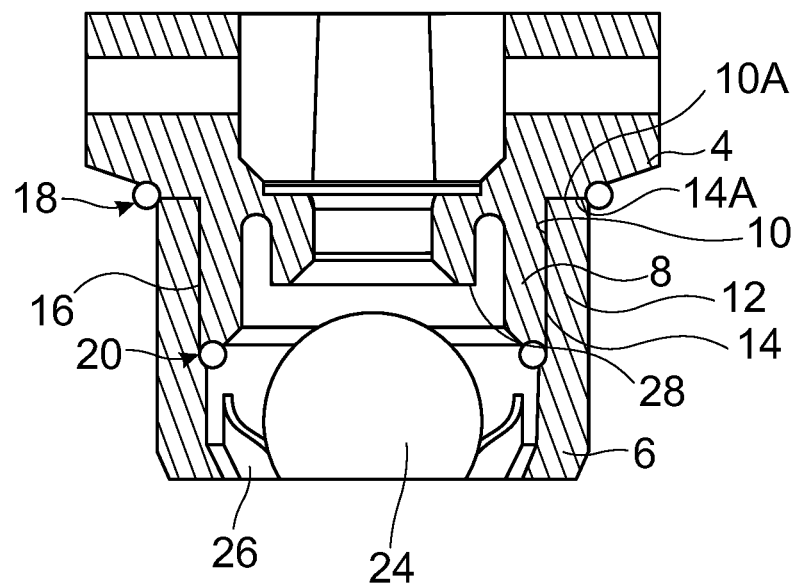
FIG. 2 shows a detail of the auto drain valve of FIG. 1 with first and second concentric elements bonded in known fashion.

With reference to FIG. 2 and with further reference to FIG. 1, the auto drain valve of FIG. 2 is of a known configuration and bonded using a known method. In FIG. 2 the bowl 4 includes a (first) bonding portion 8 with a (first) bonding face formed from faces 10 and 10A. The connector 6 includes a (second) bonding portion 12 with a (second) bonding face formed from faces 14 and 14A. When the bonding portion 10 of the bowl 4 is pushed into/introduced into the bonding portion 12 of the connector 6 the bonding faces 10/14 and 10A/14A are adjacent to each other, face each other, and are substantially parallel to each other.

FIG. 2 shows the result of bonding the bonding portions 8, 12 to each other using the known technique of applying an adhesive 16 to one or both of bonding faces 10, 14 and then pushing the bonding portion 10 of the bowl 4 into the bonding portion 12 of the connector 6 until face 10A abuts face 14A.

The act of pushing the bonding portion 10 of the bowl 4 into the bonding portion 12 of the connector 6 causes the displacement of any adhesive that will not fit between the bonding faces 10/14 and 10A/14A to be extruded from between those faces and to form beads of excess adhesive 18, 20 on the outside and inside of the auto drain valve 2.

The outside excess adhesive bead 18 is unsightly but does not affect the function of the auto drain valve 2. It is also relatively easy to remove before the adhesive 16 sets/cures.

The inside excess adhesive bead 20 is not easy to remove and can be detrimental to the correct functioning of the auto drain valve 2. It can be detrimental because the excess adhesive bead 20 is close to a check valve 22, and in particular close to a free sphere 24 which comprises a part of the check valve 22. The sphere 24 is free to move in the void between the fixed element 26 of the check valve 22 and the end of a conduit 28 closest to the fixed element 26 and may thus come into contact with the excess adhesive bead 20 before the adhesive sets. Such contact is likely to affect the function of the check valve if it functions at all. This is clearly undesirable.

Figures 3, 4:
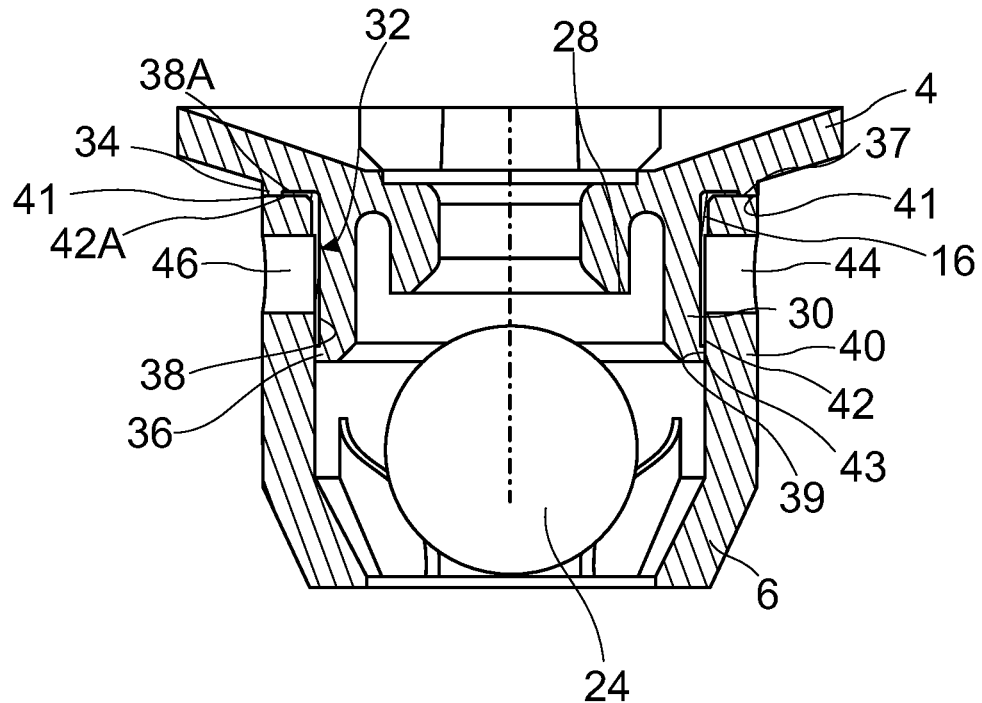
FIG. 3 shows a detail of the auto drain valve of FIG. 1 with an example of first and second concentric elements according to the present disclosure bonded according to the method of the present disclosure.
FIG. 4 shows a schematic illustration of a second example of first and second concentric elements according to the present disclosure.

With reference to FIG. 3 a detail of an auto drain valve according to the present invention is shown. As shown in FIG. 3, the bowl 4 has a (first) bonding portion 30 with a (first) bonding face 32. The bonding face 32 is comprised of an alpha plug 34 with an alpha plug face 37, a beta plug 36 with a beta plug face 39, and a void face 38. The (second) bonding portion 40 of the connector 6 includes a (second) bonding face formed from void face 42/42A, alpha bearing face 41, and beta bearing face 43.

The bonding portion 40 of the connector 6 further includes first and second passages 44, 46. Both of the passages 44, 46 extend from an outside face of the connector 6 to the void face 42 of the connector 6. The passages are spaced from each other and, in the example shown in FIG. 3 are located on opposite sides of the bonding portion 40. This has the result that the passages 44, 46 are substantially co-axial. This makes it easy and efficient to form the passages with a single drilling operation. In alternative, unillustrated, examples, the passages 44, 46 may have a different spacing from each other and may not be co-axial.

When the bonding portion 30 of the bowl 4 is pushed into/introduced into the bonding portion 40 of the connector 6 the beta plug face 39 is a sliding fit with the beta bearing face 43. The bonding portion 30 of the bowl 4 can be pushed into the bonding portion 40 of the connector 6 until the alpha plug face 37 abuts the beta bearing face 41. The first void face 38/38A is substantially parallel to and spaced from the void face 42/42A of the connector 6.

The beta plug 36 assists in centring the bonding portion 30 within the bonding portion 40.

A void for adhesive is defined by the alpha plug 34, the first void face 38, 38A, the beta plug 36, and the second void face 42, 42A.

To bond the bonding portion 30 of the bowl 4 to the bonding portion 40 of the connector 6 an adhesive 16 is injected/introduced by an operator into the void via an entry passage which is one of the passages 44, 46. The adhesive 16 is injected from a nozzle or other suitable applicator (not shown) which fits into the entry passage. The adhesive 16 is pressurised by the applicator with the result that it flows from the entry passage to the exit passage, which is the other of passages 44, 46, via the void. When or after the operator detects adhesive 16 in the exit passage the injection of adhesive into the entry passage is stopped.

Figure 5:
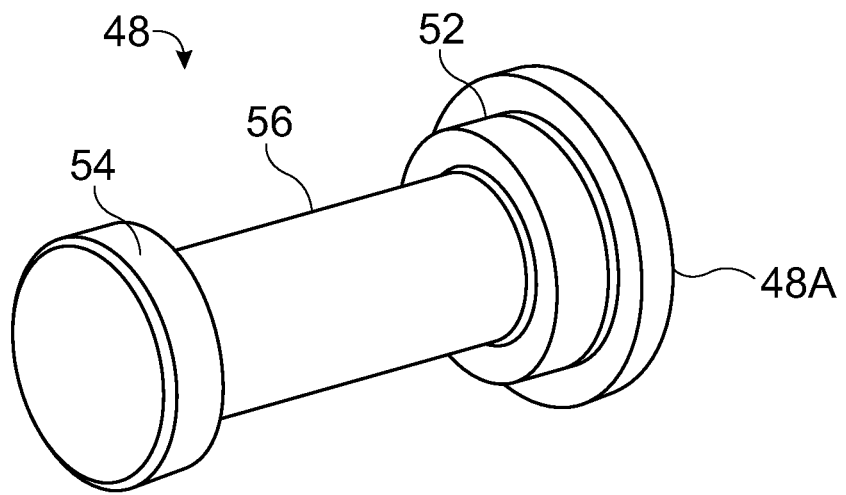
FIG. 5 shows a schematic illustration of the first concentric element of FIG. 4.

With reference to FIGS. 4 and 5 these figures show an example of the interaction of a first and second bonding portion 48, 58 of first and second concentric elements. For clarity, no other part of the first and second concentric elements is shown. The principles associated with the first and second bonding portions 48, 58 can readily be incorporated in various concentric elements.

In FIGS. 4 and 5, the first bonding portion 48 has a first bonding face 50 comprised of an alpha plug 52, a beta plug 54, and a first void face 56. The second bonding portion 58 has a second bonding face 60 including a second void face 61 and a first and second passage 62, 64. For clarity the alpha and beta plug faces and the alpha and beta bearing faces associated with first and second bonding faces 50, 60 respectively are not shown.

The first and second passage 62, 64 are located on opposite sides of the second bonding portion 58 and spaced longitudinally along the second bonding portion 58 to achieve a near maximum distance from the first passage 62 to the second passage 64 via the void. The alpha plug 52 and beta plug 54 centre the first bonding portion 48 within the second bonding portion 58. The first bonding portion 48 can be pushed into the second bonding portion 58 until a flange 48A of the first bonding portion 48 abuts the second bonding portion 58.

To bond the first bonding portion 48 to the second bonding portion 58 adhesive (not shown) is injected into the void between alpha and beta plugs 52, 54 and first and second void faces 56, 61 via an entry passage which is one of the passages 62, 64 by an operator. The adhesive is injected from a nozzle or other suitable applicator (not shown) which fits into the entry passage. The adhesive is pressurised with the result that it flows from the entry passage to the exit passage, which is the other of passages 62, 64, via the void. When or after the operator detects adhesive in the exit passage the introduction of injection into the entry passage is stopped.

In some methods of the present disclosure, when the adhesive is being injected through the entry passage, the entry and exit passages are so positioned relative to each other that the adhesive enters the void at or near the lowest portion of that void, and the adhesive has to flow upwards to reach the exit passage.

Figure 6:
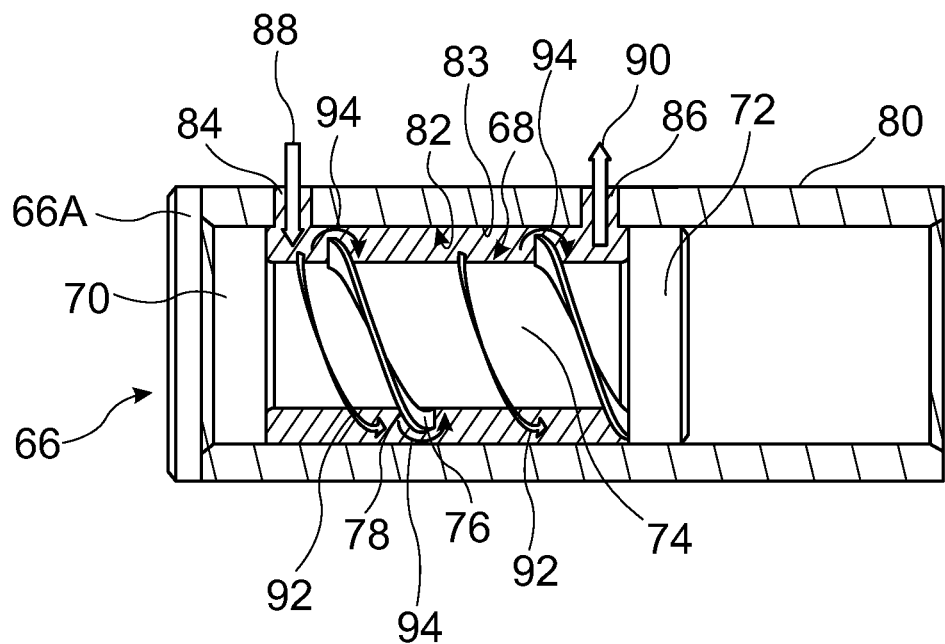
FIG. 6 shows a schematic illustration of a third example of first and second concentric elements according to the present disclosure.
Figure 7:
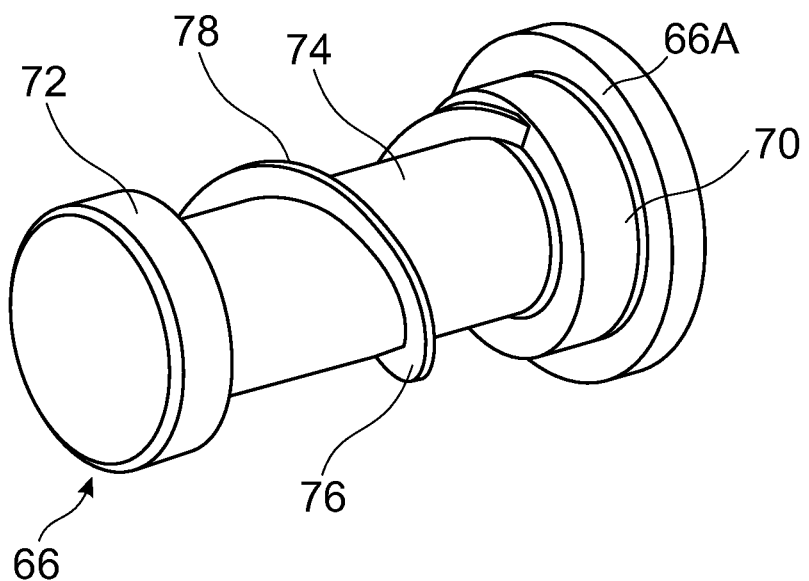
FIG. 7 shows a schematic illustration of the first concentric element of FIG. 6.

With reference to FIGS. 6 and 7 these figures show a further example of the interaction of a further first and second bonding portion 66, 80 of first and second concentric elements. For clarity, no other part of the first or second concentric elements are shown. The principles associated with the first and second bonding portions 66, 80 can again readily be incorporated in various concentric elements.

In FIGS. 6 and 7, the first bonding portion 66 has a first bonding face 68 comprised of an alpha plug 70, and beta plug 72 and a void face 74. The second bonding portion 80 has a second bonding face 82 including a second void face 83 and a first and second passage 84, 86. For clarity the alpha and beta plug faces and the alpha and beta bearing faces associated with first and second bonding faces 568, 82 respectively are not shown.

The first and second passage 84, 86 are on the same side of the second bonding portion 80 and spaced longitudinally along the second bonding portion 80.

Upstanding from the first void face 74 of the first bonding portion 66 is a helical fin 76. The helical fin 76 extends radially from the recessed face 74 to a fin edge 78. The fin edge 78 is spaced from the second void face 83 when the first bonding portion 66 is within the second bonding portion 80. In alternative, unillustrated, embodiments of the present disclosure the fin edge 78 can be in sliding contact with the second void face 83 when the first bonding portion 66 is within the second bonding portion 80.

The alpha plug 70 and beta plug 72 centre the first bonding portion 66 within the second bonding portion 80. The first bonding portion 66 can be pushed into the second bonding portion 80 until a flange 66A of the first bonding portion 66 abuts the second bonding portion 80.

To bond the first bonding portion 66 to the second bonding portion 80 adhesive (not shown) is injected into the void via an entry passage 84 by an operator. The adhesive is injected from a nozzle or other suitable applicator (not shown) and as represented by arrow 88. The nozzle fits into the entry passage 84 and the adhesive is pressurised by the applicator with the result that it flows from the entry passage 84 to the exit passage 86, via the void. The fin 76 causes a proportion of the introduced adhesive to travel helically around the first void face 74 as represented by arrows 92. The remainder of the adhesive passes between the fin edge 78 and the second void face 83 as represented by arrows 94. When or after the operator detects adhesive 16 in the exit passage 86 as represented by arrow 90 the injection of adhesive into the entry passage 84 is stopped.

The proportion of the adhesive that travels helically from the entry passage 84 to the exit passage 86 is determined by the viscosity of the adhesive and the size of the gap between the fin edge 78 and the second void face 83. The higher the viscosity and/or the smaller the size of the gap between the fin edge 78 and the second void face 83, the greater the proportion of adhesive that travels helically around the recessed face 74.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the bonding of concentric elements disclosed in the various embodiments may be used alone, in combination, or in a variety of arrangements not specifically discussed in the embodiments described above. This disclosure is therefore not limited in its application to the details and arrangement of the elements set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A component comprising:
a first concentric element and a second concentric element in which the first and second concentric elements are positioned relative to each other in the positions in which they are to be bonded together,
the first concentric element comprises a first bonding portion with a first bonding face,
the second concentric element comprises a second bonding portion with a second bonding face, a first passage, and a second passage,
the second bonding portion partially surrounds the first bonding portion and the first and second bonding faces face each other,
the first and second bonding faces comprise a first and second void face respectively, collectively the first and second bonding faces comprise an alpha plug having an alpha plug face, a beta plug having a beta plug face, an alpha bearing face, and a beta bearing face, in which
the alpha plug face is in sliding contact with the alpha bearing face and the beta plug face is in sliding contact with the beta bearing face,
the alpha plug is integral with one of the first or second void faces and the alpha bearing face is integral with the other of the first or second void faces,
the beta plug is integral with one of the first or second void faces and the beta bearing face is integral with the other of the first or second void faces, and the alpha and beta plugs and first and second void faces collectively define a void, the first and second passages each extend through the second concentric element from a mouth which opens onto the void to a mouth in an accessible surface of the second concentric element, wherein the component is an auto drain valve, and the first concentric element is a bowl and the second concentric element is a connector.

2. A component according to claim 1 in which one of the first and second bonding faces comprises the alpha and beta plugs and the other of the first and second bonding faces comprises the alpha and beta bearing faces.

3. A component according to claim 1 in which the first and second bonding portions are so configured that the first bonding portion is physically prevented from extending into the second bonding portion by more than a predetermined distance.

4. A component according to claim 1 in which the first and second bonding portions are so configured that when the first bonding portion is partially surrounded by the second bonding portion, the only movement the first bonding portion can make relative to the second bonding portion is movement between a position where the first bonding portion is not partially surrounded by the second bonding portion and the position in which the first bonding portion extends a predetermined distance into the second bonding portion.

5. A component according to claim 1 in which the mouth of the first passage onto the void and the mouth of the second passage onto the void are spaced from each other and one mouth is in the alpha plug or nearer the alpha plug than the beta plug, and the other mouth is in the beta plug or nearer the beta plug than the alpha plug.

6. A component according to claim 1 comprising at least one adhesive guide means, in which the at least one adhesive guide means extends across the most direct path from the mouth of the first passage onto the void and the mouth of the second passage onto the void.

7. A component according to claim 6 in which the adhesive guide means is fixed to one of the first and second void faces, and is in sliding contact with the other of the first and second void faces.

8. A component according to claim 1 comprising an adhesive guide means, in which the adhesive guide means is a fin extending from one of the first and second void faces toward the other of the first and second void faces, and the fin has a first end at or adjacent the alpha plug, a second end at or adjacent the beta plug, and the fin extends between its first and second ends in an at least partially non-linear direction, and the fin defines a path between the mouth of the first passage onto the void and the mouth of the second passage onto the void.

9. A component according to claim 1 comprising an adhesive guide means in which the first and second void faces are cylindrical, the adhesive guide means extends from the surface of one of the first and second void faces toward the other of the first and second void faces, and at least a part of the adhesive guide means has the form of a helix.

10. A component according to claim 1 in which the first and second elements have been bonded to each other by the injection of an adhesive into the void.

11. A component according to claim 10 in which the adhesive is one of an acrylic adhesive, a methyl methacrylate adhesive, or an epoxy adhesive.

* * * * *